June 4, 1929.　　　　B. H. PAYTON　　　　1,715,862

ARM REST

Filed March 13, 1928　　　　2 Sheets-Sheet 1

Inventor
Bernard H. Payton
by Horatio E. Bellows
Attorney

June 4, 1929.　　　　B. H. PAYTON　　　　1,715,862
ARM REST
Filed March 13, 1928　　　　2 Sheets-Sheet 2
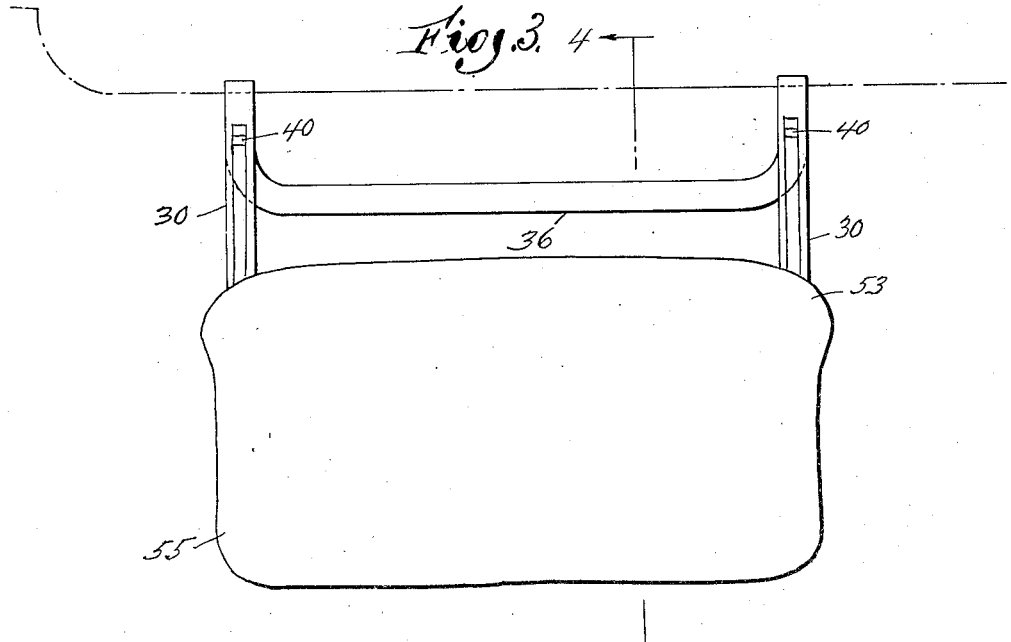
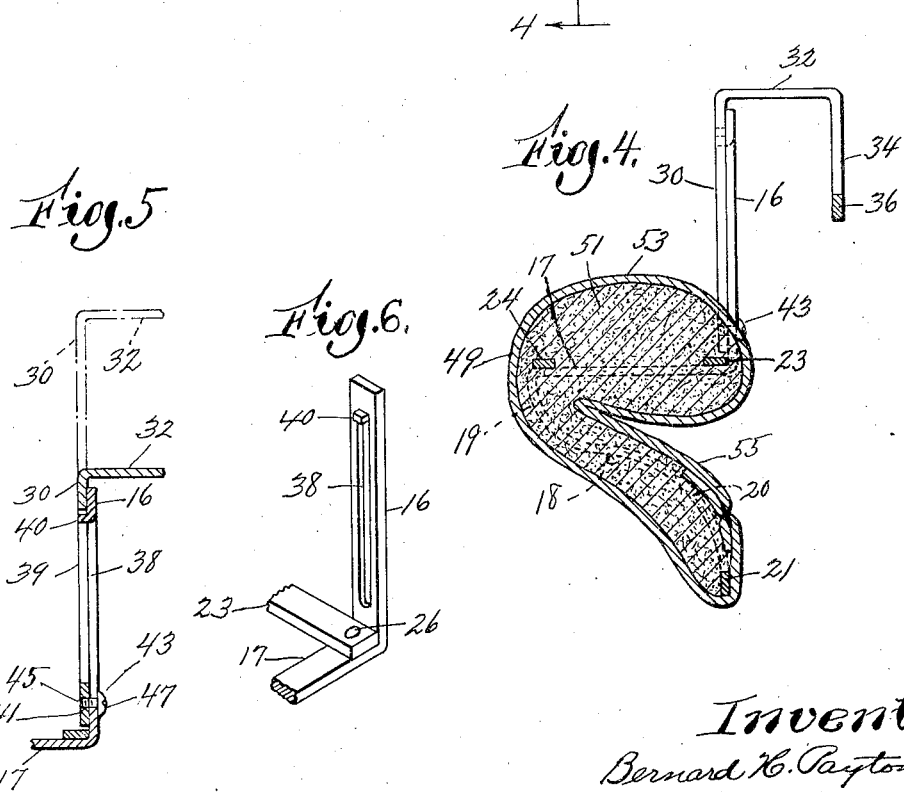
Inventor
Bernard H. Payton
by Horatio E. Bellows
Attorney Patented June 4, 1929.

1,715,862

UNITED STATES PATENT OFFICE.

BERNARD H. PAYTON, OF PROVIDENCE, RHODE ISLAND.

ARM REST.

Application filed March 13, 1928. Serial No. 261,336.

My invention relates to a suspension arm rest adapted for general use, and particularly suited to the interior of automobiles.

The essential objects of my invention are to facilitate attachment and substitution; and to insure against accidental detachment; to afford a maximum of comfort; to facilitate vertical adjustment to suit the height of the user's arm; and to attain these ends in a structure simple to operate, inexpensive to construct, and possessing great strength.

To the above ends primarily my invention resides in such parts and in such combinations of parts as fall within the scope of the appended claims.

In the accompanying drawings which form a part of this specification

Figure 1:
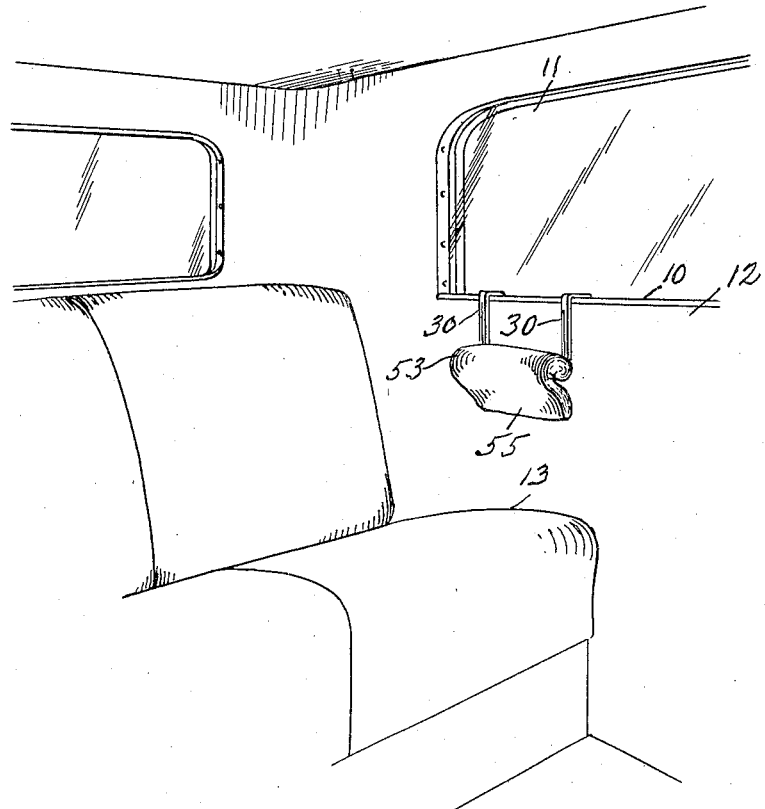
Figure 2:
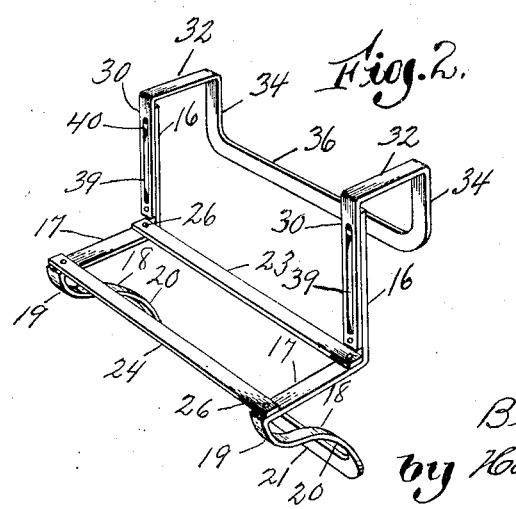

Figure 1 is a perspective view of my arm rest applied to a window in an automobile, Figure 2, a similar view of the framework of my rest, Figure 3, a front elevation of the complete rest, Figure 4, a section taken on line 4—4 of Figure 3, Figure 5, a vertical central section of a portion of the support, and Figure 6, a perspective view of a section of the support.

Like characters of reference indicate like parts throughout the views.

My device is herein illustrated attached to the sill 10 of a window 11 in the side wall 12 of an automobile body above a seat 13.

In detail my arm rest includes a skeleton frame of metal, rubber, or other suitable material which lends itself to the retention of form after initial bending. A length of flat material is bent, as shown in Figure 2, to form upright parallel sections 16, from whose lower ends forwardly extend in parallelism with each other substantially horizontal arms 17, integral with the outer extremities of which are downwardly and rearwardly directed parallel legs 18, each comprising reverse upper and lower bends 19 and 20 respectively. Continuous with the lower extremities of the legs is a horizontal connecting bar 21 in the vertical plane of the sections 16. Flat bracing rods 23 and 24 extending longitudinally of the frame have ends fixed by rivets 26 or otherwise to the arms 17 adjacent the sections 16, and at the ends of the arms respectively.

Another flat strip of similar material is bent to form vertical sections 30 of substantially the same length as the sections 16 which they slidably engage. From the tops of the sections 30 the material is bent to form horizontal, rearwardly directed arms 32 parallel with each other terminating at their rear ends with bends forming depending portions 34 integral with a horizontal connecting bar 36. The sections 16 and 30 are provided respectively with vertical oblong slots 38 and 39. At the top of the slots 38 the sections 16 are provided with forwardly projecting lugs 40 extending into the slots 39 and slidable therein. Each section 30 is provided at its lower end, below the slot 39, with a threaded perforation 41. A machine or clamping screw, represented in a general way by 43, has a threaded shank 45 engageable in the threaded perforation 41, through the slot 38, and a head 47 of greater diameter than the width of the slot 38, resting against the rear face of the section 16.

The parts of the framework below the sections 30 are enclosed by a cover 49 of any suitable material such as leather or velour, which follows generally the contour of the enclosed framework. The latter is covered with batting 51, and completes the body of the arm rest. The latter comprises a horizontally disposed forwardly extending arm support 53, substantially elliptical in vertical section, and a downwardly and rearwardly inclined brace 55 terminating in substantially the vertical plane of the rear extremity of the arm support.

The parts above the body portion constitute a suspension means for supporting the body. The broad hook or loop formed by the frame portions 30, 32, 34 and 36 is adapted to engage a sill 10 or the like, while the vertical portions 16 cooperate with the portions 30 to form the legs of a hanger completed by the broad hook. The latter is vertically adjustable to the height of the arm of any particular user by loosening the clamping screw 43, and sliding the arm sections 16 and 30 relatively to each other and then retightening the screw. During the adjustment the lugs 40 move in the guide slots 39, while the screw slides in the guide slot 38. The broken lines shown in Figure 5 indicate an adjusted position of the sections.

It will be noted that portion 55 of the body cooperates with the wall against which its end contacts to form a brace for the arm rest portion 52.

It is to be understood that the invention is not limited to the specific form herein illustrated and described but may be embodied in other forms without departure from its spirit as defined by the following claims.

I claim:

1. In an arm rest, a skeleton frame comprising horizontally disposed parallel end arms, upright sections upon the rear ends of the arms, downwardly and rearwardly inclined resilient arms connected at their upper ends with the forward ends of the horizontal arms and provided with reverse bends, a rod connecting the lower ends of the inclined arms, bracing bars connecting the horizontal arms, a covering enclosing the frame below the upright sections, padding surrounding the portion of the frame within the covering, and a vertically disposed hook supported by the upright sections.

2. In an arm rest, a skeleton frame comprising horizontally disposed parallel end arms, upright extensions upon the rear ends of the arms, downwardly and rearwardly inclined resilient arms connected at their upper ends with the forward ends of the horizontal arms, a rod connecting the lower ends of the inclined arms, bracing bars connecting the horizontal arms, a covering enclosing the frame below the vertical extensions, padding surrounding the portion of the frame within the covering and a vertically disposed hook supported by the upright sections.

3. In an arm rest, a skeleton frame comprising horizontally disposed parallel end arms, upright attaching members carried by the arms, downwardly and rearwardly inclined reversely bent resilient arms supported by the end arms, a rod connecting the rear ends of the inclined arms, a covering enclosing all the frame except the attaching members, and padding within the covering and members on the end arms having reverse bends confined within the covering.

In testimony whereof I have affixed my signature.

BERNARD H. PAYTON.